United States Patent [19]

Sliger

[11] 4,426,036
[45] Jan. 17, 1984

[54] VALVE CONSTRUCTION AND METHOD OF MAKING THE SAME

[75] Inventor: Boyd P. Sliger, Concord, Tenn.

[73] Assignee: Robertshaw Controls Company, Richmond, Va.

[21] Appl. No.: 407,503

[22] Filed: Aug. 12, 1982

Related U.S. Application Data

[63] Continuation of Ser. No. 888,015, Mar. 20, 1978, abandoned.

[51] Int. Cl.³ .............................................. F01P 7/02
[52] U.S. Cl. ................................... 236/34.5; 251/333
[58] Field of Search .................. 236/34, 34.5; 251/333

[56] References Cited

U.S. PATENT DOCUMENTS 3,734,405 5/1973 Wagner ............................. 236/34.5

FOREIGN PATENT DOCUMENTS 8986 of 1884 United Kingdom ................ 251/333

Primary Examiner—William E. Tapolcai
Attorney, Agent, or Firm—Candor, Candor & Tassone

[57] ABSTRACT

A valve construction having a valve seat and a movable valve member for opening and closing the valve seat and being operatively interconnected to a thermal power element carried by the valve construction, the valve member having a relatively narrow annular edge for closing against the valve seat in a direction substantially perpendicular to the valve seat and the valve seat having an annular flexible elastomeric insert that is wider than the annular edge of the valve member whereby the annular edge of the valve member closes against the annular flexible elastomeric insert within the inner and outer peripheral edges thereof to close the valve seat. The edge of the valve member is turned to present a knife-edge to the insert and an arcuate annular surface on the valve member that begins at the knife-edge.

2 Claims, 3 Drawing Figures

1

VALVE CONSTRUCTION AND METHOD OF MAKING THE SAME

CROSS REFERENCE TO RELATED APPLICATION

This application is a Continuation patent application of its copending parent patent application, Ser. No. 888,015 filed Mar. 20, 1978, now abandoned.

BACKGROUND OF THE INVENTION

1. Field of the Invention

This invention relates to an improved thermostatically operated valve construction and method of making the same.

2. Prior Art Statement

It is known to provide a valve construction having a valve seat and a movable valve member for opening and closing the valve seat and being operatively interconnected to a thermal power element carried by the valve construction.

For example, see the following three United States Patents and the following British Patent:

(1) U.S. Pat. No. 2,872,119—Puster
(2) U.S. Pat. No. 3,182,910—Karppinen et al
(3) U.S. Pat. No. Re-14,424—Scoville
(4) British Pat. No. 8,986—Busbridge et al.

It appears that the valve member of the valve construction of item (1) above has a realtively narrow annular edge for closing against a solid valve seat.

It appears that the valve member of the valve construction of item (2) above has a relatively wide annular edge for closing against a valve seat that is covered with elastomeric material.

It appears that the valve member of the valve construction of item (3) above has a relatively wide area for closing against a valve seat that has annular elastomeric inserts disposed therein, the valve member closing not only against the elastomeric inserts, but also against the surrounding metallic surface of the valve seat.

It appears that the valve member of the valve construction of item (4) above has an annular knife-edge for engaging against a resilient insert carried by the valve seat and being wider than the annular knife-edge of the valve member whereby the annular knife-edge of the valve member closes against the annular flexible insert within the outer and inner peripheral edges thereof to close the valve seat.

SUMMARY OF THE INVENTION

It is a feature of this invention to provide a valve seat of a valve construction with an annular flexible elastomeric insert to be engaged by a relatively narrow annular edge of a valve member and thereby close the valve seat to prevent leakage therethrough.

In particular, it has been found that there is a tendency for some vehicle type water cooled internal combustion engines to reject an insufficient amount of heat generated by the process of combustion to the cooling medium to sufficiently heat the engine to a temperature for efficient operation and to provide an adequate heat for operator and passenger comfort, especially during vehicle operation in periods of very low ambient temperature.

One principle cause of this condition is that the coolant fluid which is allowed to pass through the thermostatic valve as leakage when the valve construction is closed and supposedly blocking flow to the radiator due to imperfections, out-of-roundness, etc., of the valve seat and the valve member.

However, it was found according to the teachings of this invention that if an annular flexible elastomeric insert is provided in the valve seat and the valve member is provided with a relatively narrow annular edge for engaging the annular insert completely within the inner and outer peripheral edges thereof, such insert will be compressed by such annular edge in a manner to compensate for any imperfection, out-of-roundness, etc., to prevent the aforementioned leakage problem.

In particular, one embodiment of this invention provides a valve construction having a valve seat and a movable member for opening and closing the valve seat and being operatively interconnected to a thermal power element carried by the valve construction, the valve member having a relatively narrow annular edge for closing against the valve seat. The edge of the valve member is turned to present a knife-edge to the insert and an arcuate annular surface on the valve member that begins at the knife-edge, is disposed inboard of the knife-edge and has its convex side facing the insert. An annular flexible elastomeric insert is carried by the valve seat and is wider than the annular edge of the valve member whereby the annular edge of the valve member closes against the annular flexible elastomeric insert within the inner and outer peripheral edges thereof to close the valve seat.

Accordingly, it is an object of this invention to provide an improved valve construction having one or more of the novel features of this invention as set forth above or hereinafter shown or described.

Another object of this invention is to provide an improved method for making such a valve construction or the like, the method of this invention having one or more of the novel features of this invention as set forth above or hereinafter shown or described.

Other objects, uses and advantages of this invention are apparent from reading of this description which proceeds with reference to the accompanying drawing forming a part thereof and wherein:

BRIEF DESCRIPTON OF THE DRAWINGS

DESCRIPTION OF THE PREFERRED EMBODIMENT

Figure 1:
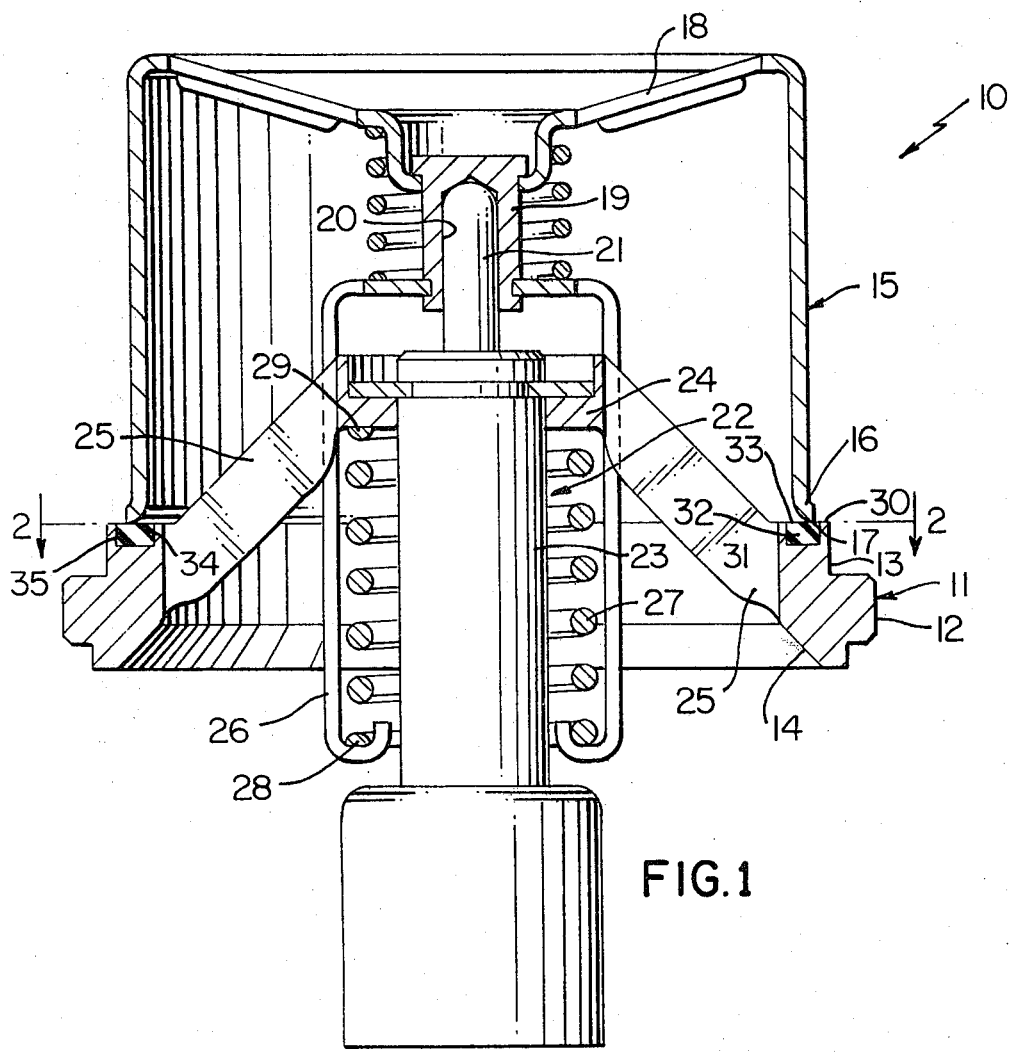
FIG. 1 is a cross-sectional view illustrating the improved valve construction of this invention.
Figure 2:
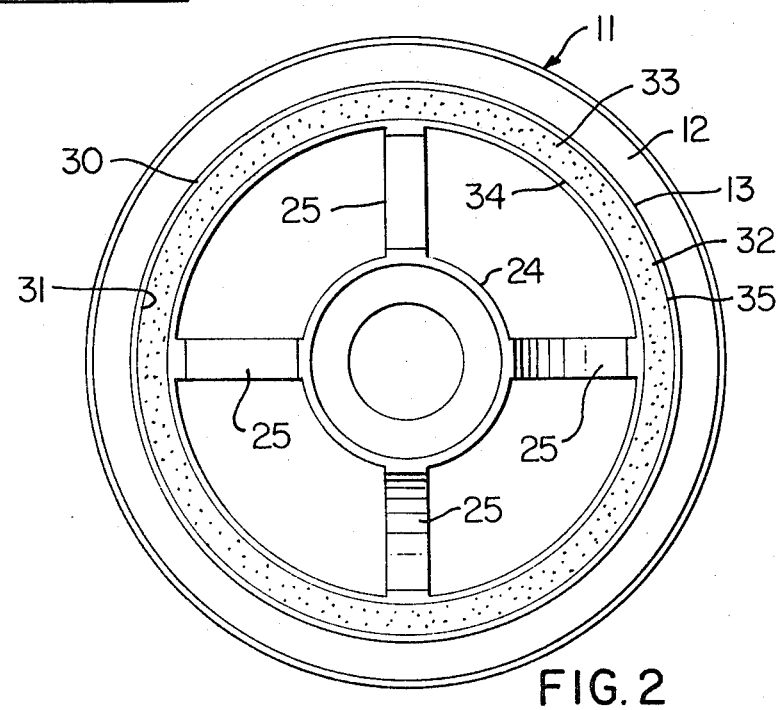
FIG. 2 is a cross-sectional view taken on line 2—2 of FIG. 1.

While the various features of this invention are hereinafter described and illustrated as being particularly adapted to provide a valve construction for the cooling system of an internal combustion engine for a vehicle, such as a truck or the like, it is to be understood that the various features of this invention can be utilized singly or in any combination thereof to provide a valve construction for other devices as desired.

Therefore, this invention is not to be limited to only the embodiment illustrated in the drawing, because the drawings are merely utilized to illustrate one of the wide variety of uses of this invention.

Figure 3:
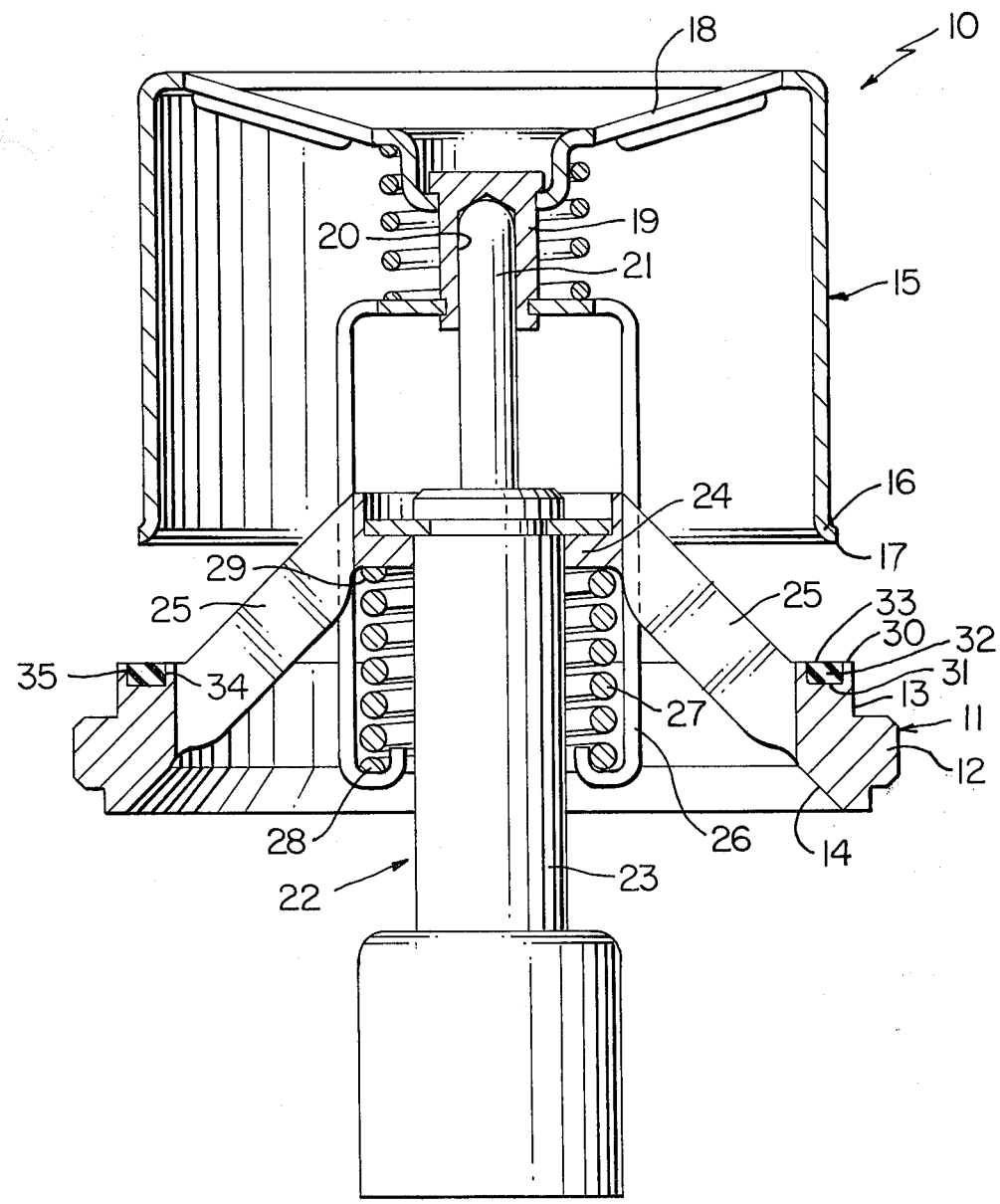
FIG. 3 is a view similar to FIG. 1 and illustrates the valve construction of this invention in an open condition thereof.

Referring now to FIGS. 1 and 3, the improved valve construction of this invention is generally indicated by the reference numeral 10 and comprises a metallic flange member 11 having an outwardly directed peripheral portion 12 for being secured in a coolant passage means of a vehicle so that coolant fluid must pass through a valve seat portion 13 of the flange member 11 and out through an opening means 14 thereof when a movable valve member 15 of the valve construction 10 is disposed in an open condition as illustrated in FIG. 3.

The movable valve member 15 comprises a substantially cup-shaped metallic member with the outer annular peripheral postion 16 thereof being turned outwardly to present a knife-like edge 17 to the valve seat 13 for a purpose hereinafter described, the cup-shaped valve member 15 having a closed end 18 secured to an overrun fixture 19 that receives, in an opening 20 thereof, a piston 21 of a conventional piston and cylinder type thermal power element that is generally indicated by the reference numeral 22.

The thermal power element 22 includes a cylinder member 23 containing a petroleum base wax charge therein which, in effect, operates on the piston 21 to force the piston 21 out of the cylinder 23 upon the expansion of the wax charge through heating thereof and permits the piston 21 to be retracted into the cylinder 23 upon the contraction of the wax charge through a subsequent cooling thereof in a manner well known in the art.

The cylinder 23 of the thermal power element 22 is interconnected to a central web portion 24 of the flange member 11 that spins the valve seat portion 13 by a plurality of narrow struts 25 as illustrated.

The overrun fixture 19 is interconnected to a bracket member 26 that supports a return compression spring 27 in such a manner that one end 28 of the compression spring 27 bears against the bracket 26 and the other end 29 thereof bears against the central web 24 of the flange member 11 whereby the force of the compression spring 27 continually tends to urge the piston 21 into the fixed cylinder 23 of the thermal power element 22 and, thus, tends to move and hold the valve member 15 in its closed position against the valve seat portion 13 as illustrated in FIG. 1.

The valve seat portion 13 of the flange member 11 has a substantially flat surface 30 facing the annular end 16 of the valve member 15 and is interrupted by a relatively wide annular groove 31 which has an annular flexible elastomeric insert 32 molded therein and being provided with a substantially flat exterior surface 33 that is disposed substantially flush with the flat surface 30 of the valve seat portion 13 as illustrated.

It can be seen that the insert 32 has an inner annular periphery 34 and an outer annular periphery 35 that are disposed relatively far apart from each other when considering the width of the knife-edge 17 of the end 16 of the valve member 15 closing thereagainst as illustrated in FIG. 1 whereby the relatively wide annular insert 32 insures that the narrow annular edge 16 of the valve member 15 will close within the inner and outer peripheries 35 and 35 of the insert 32 regardless of imperfections, out-of-roundness, etc. In this manner, the end edge 16 of the valve member 15 will fully compress and embed into the insert 32 to prevent leakage through the closed valve seat portion 13 when the valve member 15 is in the closed position as illustrated in FIG. 1.

While any suitable material can be utilized for the flexible insert 32 of this invention to function in the above manner and as hereinafter described, one embodiment that has operated satisfactorily included a flange member 11 formed of forging brass with a nitrile rubber insert 32 molded therein by the Precision Rubber Products Corporation of Lebanon, Tennessee, the nitrile rubber insert 32 comprising Precision Rubber Products Corporation nitrile rubber compound No. 1459 having a durometer rating of approximately 90.

Accordingly, the term "elastomeric" as utilized above and in the appended claims is intended to cover all suitable materials, whether of various types of rubber or plastic or combinations thereof, and this invention is not to be limited to the above specific example.

From the above, it can be seen that conventional thermally operated valve constructons can be modified according to the method of this invention to include the annular flexible elastomeric insert in the valve seat thereof so that all other parts thereof need not be modified in order to incorporate the features of this invention to operate in substantially the same manner as the valve construction 10 of this invention and now to be described.

When the coolant being controlled by the valve construction 10 is at a temperature that causes the wax charge in the thermal power element 22 to expand and hold the valve member 15 in the open condition illustrated in FIG. 3 in opposition to the force of the spring 27, it can be seen that the insert 32 does not impede any fluid flow through the opened valve seat portion 13 and since the insert 32 has its flat surface 33 flush with the flat surface 30 of the metallic valve seat portion 13, the high velocity flow of fluid past the insert 32 does not work against the same to tend to loosen such insert 32 from its molded in condition.

Subsequently, should the thermal power element 22 cool sufficiently to permit the valve member 15 to close under the force of the compression spring 27, the closing of the valve member 15 from the position illustrated in FIG. 3 back to the position illustrated in FIG. 1 causes the knife edge 17 of the narrow end 16 of the valve member 15 to compress against the surface 33 of the insert 32 inboard of the inner and outer peripheries 34 and 35 thereof to completely embed therein and seal around the valve seat portion 13 to compensate for any imperfections, out-of-roundness, etc., between the valve member 15 and the valve seat portion 13 of the flange member 11. Thus, the closed valve construction 10 will have less tendency to leak than if the valve member 15 merely closed against a metallic valve seat 13 without the improved insert 32 of this invention.

The opening and closing of the valve member 15 previously described under the control of the thermal power element 22 is an operation that is well known in the art, such as is described in the afore-mentioned U.S. Pat. to Puster, No. 2,872,119.

However, it can be seen that the force of the compression spring 27 pushing downwardly in FIG. 1 on the bracket 26 and, thus, urging the valve member 15 into its closed position against the insert 32 fully embeds the knife-edge 17 of the end 16 of the valve member 15 into the flexible insert 32 to assure the closed sealing effect previously described to prevent leakage through the closed valve construction 10.

Thus, it can be seen that this invention provides an improved valve construction as well as an improved method of making such a valve construction or the like.

While the form and method of this invention, now preferred, have been illustrated and described as required by the Patent Statute, it is to be understood that other forms and method steps can be utilized and still fall within the scope of the appended claims.

What is claimed is:

1. In a valve construction having a valve seat and a movable valve member for opening and closing said valve seat and being operatively interconnected to a thermal power element carried by said valve construction, said valve member having a relatively narrow annular edge for closing against said valve seat in a direction substantially perpendicular to said valve seat, an annular flexible elastomeric insert being carried by said valve seat and being wider than said annular edge of said valve member whereby said annular edge of said valve member closes against said annular flexible elastomeric insert within the inner and outer peripheral edges thereof to close said valve seat, the improvement wherein said edge of said valve member is turned to present a knife-edge to said insert and an arcuate annular surface on said valve member that begins at said knife-edge and is inboard of said knife-edge and has its convex side facing said insert.

2. In a method of making a valve construction having a valve seat and a movable valve member for opening and closing said valve seat and being operatively interconnected to a thermal power element carried by said valve construction, said valve member having a relatively narrow annular edge for closing against said valve seat in a direction substantially perpendicular to said valve seat, an annular flexible elastomeric insert being carried by said valve seat and being wider that said annular edge of said valve member whereby said annular edge of said valve member closes against said annular flexible elastomeric insert within the inner and outer peripheral edges thereof to close said valve seat, the improvement comprising the step of turning said edge of said valve member to present a knife-edge to said insert and form an arcuate annular surface on said valve member that begins at said knife-edge and is inboard of said knife-edge and has its convex side facing said insert.

* * * * *